March 29, 1966 J. M. LALIKOS ET AL 3,243,208
COMPRESSED SLEEVE COUPLING FOR FLEXIBLE HOSES
Filed June 4, 1964
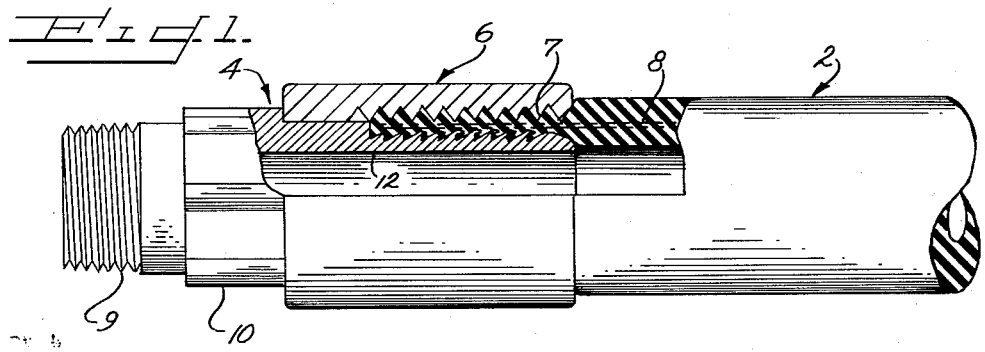
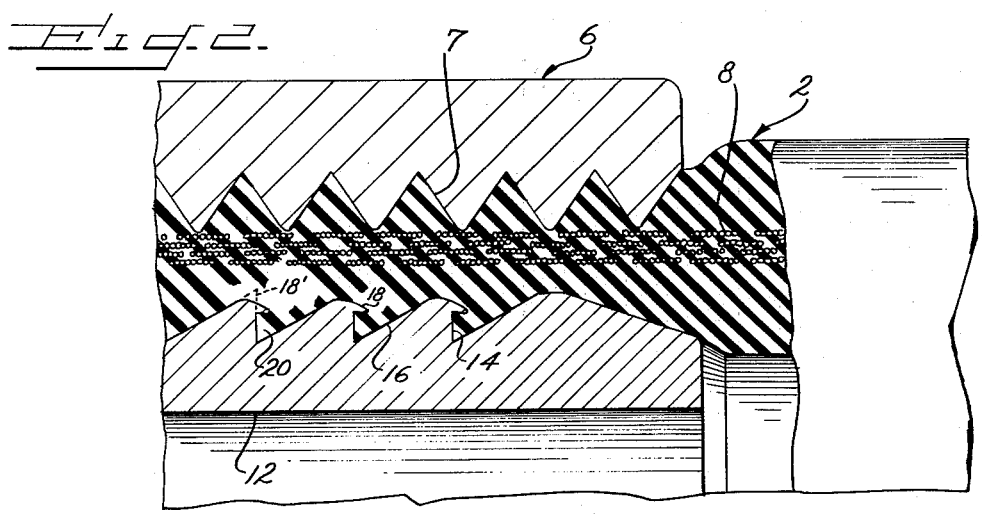
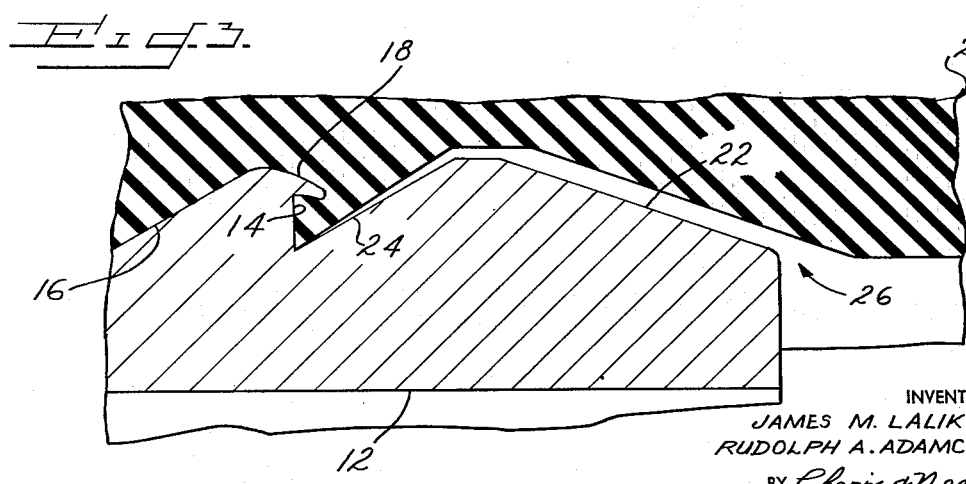
INVENTORS
JAMES M. LALIKOS
RUDOLPH A. ADAMCZYK
BY Chapin & Neal
ATTORNEYS United States Patent Office 3,243,208
Patented Mar. 29, 1966

3,243,208
COMPRESSED SLEEVE COUPLING FOR
FLEXIBLE HOSES
James M. Lalikos, Springfield, and Rudolph A. Adamczyk,
Ludlow, Mass., assignors to Atlas Corporation, New
York, N.Y., a corporation of Delaware
Filed June 4, 1964, Ser. No. 372,483
3 Claims. (Cl. 285—256)

This invention relates to hose couplings or fittings of the compressed sleeve type and particularly to a coupling in which the end of a flexible hose is compressed between an insert or nipple and an outer sleeve or collar member by contraction of the latter.

An object of the invention is to provide a coupling adapted to withstand high pressures and in which the presence of high internal pressures serves to assist in sealing off leakage paths between the hose and insert.

Another object of the invention is to provide an insert surface form which serves to "lock" the hose material against the insert when the hose end is contracted by compression of the sleeve and in which the introduction of high fluid pressures into the space between hose and insert surface results in increasing the effective sealing area between the two.

The above and other specific objects and advantages of the invention will be apparent from the following description of an embodiment thereof as shown by the accompanying drawings, in which:

FIG. 1 is a view partly in elevation and partly in section of a coupling embodying the invention;

FIG. 2 is a fragmentary sectional view on an enlarged scale showing the new form of contoured ridges and grooves of the insert of FIG. 1; and FIG. 3 is a fragmentary section on a still larger scale illustrating the action of the fitting under high internal pressures and introduction of a leakage path.

Referring to FIG. 1 a flexible hose is shown at 2 with a coupling fitted on the end thereof. The nipple or insert of the coupling is at 4, and a collar or sleeve at 6. A flexible wire braid 8 is shown embedded in the wall of the hose. This invention is equally applicable to fittings for hose made completely of plastic materials or to other specific types of hose in which a liner is sheathed with an outer wrapping such as a wire braid, and the liner is formed of rubber or other plastic material as commonly used for such flexible tubing. The fitting is specifically designed, in any case, for hose conduit service under conditions of extremely high pressure use.

In the coupling of FIG. 1 the nipple has a conventional externally threaded outer end 9, a flanged adapter portion 10 of hexagonal outer surface form for application of wrench faces, and an inner nipple end 12 for insertion within the open end of the hose. The sleeve is here shown as a collar member 6 abutting the adapter 10 at one end and surrounding the insert with the end of the hose compressed therebetween. The inner wall of the sleeve is furthermore formed with conventional annular threads 7 biting into the material of the outer hose wall.

It will be appreciated that the specific form of insert and collar as herein described thus far is a conventional type of hose fitting and that other specific constructions thereof may be utilized.

As shown (FIGS. 1 and 2) the outer wall of the nipple insert 12 is formed with grooves and ridges. In sectional profile the contour of the ridges and grooves generally simulates saw teeth facing inwardly of the hose length. As best shown by FIG. 2, one side of each ridge, as the wall at 14, is approximately at 90° to the longitudinal axis of the nipple while the other side 16 of the ridge at an acute angle relative to the side 14 and to the nipple and hose axis. Furthermore, the tip end sections 18 between the two sides are directed outwardly of the free end of the nipple and inwardly to form a pocket as at 20. The tips 18 may be conveniently shaped after the grooves between adjacent sides 14 and 16 are cut in the outer wall. A tumbling process may be used to peen over and flatten the peaks (indicated by the dotted line at 18′) thus deforming the metal outwardly and turning the tips inwardly. The pocketed area at 20 is thus formed in each groove between the ridges. It is defined by the underside of tip 18, the upstanding side wall 14 and the adjacent section of the complementary wall 16 of each groove. The face of the annular wall 16 of each groove, as shown, is of substantially greater area than the face of a wall 14.

In initially attaching a coupling or fitting to the hose the collar is first slipped over the end of the hose and the nipple inserted into the open end causing it to expand in the conventional manner. The collar is next turned on the expanded hose and moved against the adapter 10 to encase the end between it and the insert. The collar is finally compressed by a suitable device to anchor the fitting and hose securely together. Preferably, draw swaging methods are used to compress the assembly so that as the swager moves progressively from the outer end of the collar toward the adapter 10 the material of the hose is pressed forwardly in advance of the tool and is thus compressed into the spacing of the collar threads and is also "milked" into the pockets 20 formed by the ridged and grooved contour of the insert. The material of the hose adjacent the insert can thus flow into all grooved areas and all voids are eliminated.

Referring now to FIG. 3, at the outer end of the nipple is a gradually angled face at 22 which provides an annular tapered or flared end surface for entrance of the fitting insert into the bore of the hose. As will be seen, while the insert is being thrust into the open end of the hose, the surface 22 progressively enlarges the internal diameter of the inner wall sufficiently to readily pass the ridged contours into place for final assembly and without tending to tear at the wall.

When the fitting is compressed into the final assembly, fluid under a sufficiently high pressure in the hose first tends to force an entrance to a leakage path, if any, between the hose and surface 22. As will be seen from the exaggerated showing of FIG. 3 this leakage path 26 would be developed past surface 22 and inwardly toward the bottom of the outermost groove formed by the lower wall at 24 of the first pocket 20. It will be noted that the length of wall 24 which is similar to walls 16 is greater than the length of upstanding surface 14 of the adjacent ridge. Accordingly, fluid pressures advancing along such a path will tend ot exert increasingly greater pressures radially against the material trapped in the pocket 20 and provide pressure assistance for an increasingly effective sealing area concentrated against the upstanding surface 14 at the underside of the inwardly turned tip 18. Thus, as soon as any leakage path is developed past the surface 22 the contoured design of ridges and grooves takes advantage of the pressures to assist in developing a more effective seal against further leakage. This is in contrast to commonly used hose fittings in which the leakage path is normally diminished over the length of the fitting seal area and thus requires an elongated fitting for satisfactory performance. Since the intensity of the forces of pressure about the surfaces 24 and 16 are greatly diminished due to the contoured overlap the leakage permitted beyond each successive groove is diminished at a greater rate than in prior designs.

What is claimed is:
1. In an end fitting for fluid pressure hose wherein the hose wall is compressed between a tubular insert and a collar member: an insert having an outer wall contoured with annular ridges and grooves, said ridges having annular sides which face toward the inserted end of the insert at a generally perpendicular angle relative to the hose axis and annular sides which are facing away from said inserted end at an acute angle to said axis, said ridges having tip end sections between said sides angularly directed towards said inserted end to overhang said first mentioned annular sides and forming therewith an annular pocketed area at said first mentioned sides of the ridges whereby fluid leakage under pressure along said second mentioned sides progressively increases the pressure of said hose wall against said first mentioned sides to prevent a progressive enlargement of such fluid leakage.

2. The structure of claim 1 in which said angularly directed tip end sections of the ridges are also radially inclined inwardly of the insert wall.

3. The structure of claim 1 in which said first mentioned perpendicularly angled annular sides of the ridges are substantially less in annular surface area than the annular surface area of said second mentioned acutely angled sides.

References Cited by the Examiner
UNITED STATES PATENTS

| | | | |
|---|---|---|---|
| 1,980,466 | 11/1934 | Angeja | 285—259 X |
| 2,142,752 | 1/1939 | Howard | 285—257 |
| 2,319,024 | 2/1943 | Wehringer | 285—256 |
| 2,926,029 | 2/1960 | St. Clair et al. | 285—256 |

CARL W. TOMLIN, *Primary Examiner.*

THOMAS F. CALLAGHAN, *Examiner.*